(12) United States Patent
Choi et al.

(10) Patent No.: US 11,763,824 B2
(45) Date of Patent: Sep. 19, 2023

(54) VOICE RECOGNITION BASED USER AUTHENTICATION METHOD USING ARTIFICIAL INTELLIGENCE DEVICE AND APPARATUS THEREFOR

(71) Applicant: LG ELECTRONICS INC., Seoul (KR)

(72) Inventors: Daeseok Choi, Seoul (KR); Jeongsoo Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 933 days.

(21) Appl. No.: 16/586,433

(22) Filed: Sep. 27, 2019

(65) Prior Publication Data
US 2020/0026838 A1  Jan. 23, 2020

(30) Foreign Application Priority Data
Jul. 30, 2019 (KR) .......................... 10-2019-0092761

(51) Int. Cl.
| | | |
|---|---|---|
| G10L 17/24 | (2013.01) | |
| G06F 21/32 | (2013.01) | |
| G10L 17/00 | (2013.01) | |
| H04W 12/06 | (2021.01) | |
| G10L 15/22 | (2006.01) | |
| G06V 40/70 | (2022.01) | |
| H04L 9/32 | (2006.01) | |

(52) U.S. Cl.
CPC .............. *G10L 17/24* (2013.01); *G06F 21/32* (2013.01); *G06V 40/70* (2022.01); *G10L 15/22* (2013.01); *G10L 17/00* (2013.01); *H04L 9/3231* (2013.01); *H04W 12/06* (2013.01)

(58) Field of Classification Search
USPC .......................................... 455/411
See application file for complete search history.

(56) References Cited

U.S. PATENT DOCUMENTS

| | | | |
|---|---|---|---|
| 2004/0162726 A1* | 8/2004 | Chang ..................... | G10L 17/26 704/E17.015 |
| 2015/0098523 A1* | 4/2015 | Lim ...................... | H04L 27/368 375/297 |
| 2015/0161990 A1* | 6/2015 | Sharifi .................. | G10L 15/063 704/251 |

(Continued)

*Primary Examiner* — Amal S Zenati
(74) *Attorney, Agent, or Firm* — LEE, HONG, DEGERMAN, KANG & WAIMEY PC

(57) ABSTRACT

A voice recognition based user authentication method using an AI device is disclosed. A voice recognition based user authentication method using an AI device according to an embodiment of the present invention performs first user authentication on the basis of voice characteristics of a first speech of a specific user, provides at least one specific inquiry about a living history of an authentic user of the device to the specific user, senses at least one second speech which is a reply of the specific user to the at least one specific inquiry and performs second user authentication for the specific user to use the device on the basis of contents included in the at least one second speech. An intelligent computing device of the present invention can be associated with artificial intelligence modules, drones (unmanned aerial vehicles (UAVs)), robots, augmented reality (AR) devices, virtual reality (VR) devices, devices related to 5G service, etc.

14 Claims, 17 Drawing Sheets

(56) References Cited

U.S. PATENT DOCUMENTS

| | | | |
|---|---|---|---|
| 2016/0163312 A1* | 6/2016 | Henton | G10L 13/08 704/270.1 |
| 2017/0105112 A1* | 4/2017 | Park | H04L 5/0048 |
| 2018/0182390 A1* | 6/2018 | Hughes | G10L 15/02 |
| 2018/0233152 A1* | 8/2018 | Olaya | G10L 15/22 |

* cited by examiner

VOICE RECOGNITION BASED USER AUTHENTICATION METHOD USING ARTIFICIAL INTELLIGENCE DEVICE AND APPARATUS THEREFOR

CROSS-REFERENCE TO RELATED APPLICATIONS

Pursuant to 35 U.S.C. § 119(a), this application claims the benefit of earlier filing date and right of priority to Korean Patent Application No. 10-2019-0092761, filed on Jul. 30, 2019, the contents of which are hereby incorporated by reference herein in its entirety.

TECHNICAL FIELD

The present invention relates to a user authentication method using an artificial intelligence (AI) device, and more specifically, to a voice recognition based user authentication method using an AI device and an apparatus therefor.

BACKGROUND ART

Various technologies are studied with respect to user authentication. Particularly, user authentication using biometric information such as fingerprint recognition, voice recognition and iris recognition is used in various fields, and voice recognition is actively studied due to simplicity of system and a high recognition rate.

In the case of conventional speaker recognition, a speaker voice input to a microphone is digitalized through an analog-to-digital converter (ADC), subjected to filtering and gain control and then transmitted to a central processing unit (CPU). The CPU which has received speaker voice compares the signal input thereto with a user voice stored in a memory through a user recognition algorithm to authenticate the speaker.

Since a user voice can be easily exposed to other people and identity theft due to recording easily occurs, an enhanced user authentication method based on voice recognition is needed.

DISCLOSURE

Technical Problem

An object of the present invention is to solve the aforementioned necessity and/or problems.

Further, an object of the present invention is to realize a user authentication method based on voice recognition.

Further, an object of the present invention is to realize a user authentication method which inquires of a specific user who performs user authentication about a living history of an authentic user and performs user authentication based on a reply of the specific user to the inquiry.

Further, an object of the present invention is to realize a method of generating inquiries about a living history of an authentic user of a device using artificial intelligence.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

A voice recognition based user authentication method using an AI device according to one aspect of the present invention includes: performing first user authentication on the basis of voice characteristics of a first speech of a specific user; providing at least one specific inquiry about a living history of an authentic user of the device to the specific user; sensing at least one second speech which is a reply of the specific user to the at least one specific inquiry; and performing second user authentication for the specific user to use the device on the basis of contents included in the at least one second speech.

The second user authentication may be successfully performed when a correct reply to the at least one specific inquiry in the contents included in the at least one second speech is equal to or greater than a specific value.

The performing of the first user authentication may further include: analyzing a first tone of the first speech; and determining whether the first tone matches a second tone of the authentic user.

The second tone may be stored in advance in the device.

The providing of the at least one specific inquiry may further include generating the specific inquiry, by the device, on the basis of living history data in which the living history of the authentic user has been recorded.

The living history of the authentic user may be associated with at least one of a call record, a text message record, a specific place visit record, a purchase record, a schedule record and a credit card use record of the authentic user.

The living history data may include data in which a user choice (UC) record with respect to a choice of a specific object related to the living history of the authentic user, performed by the authentic user using the device, has been converted into text and stored along with a time at which the specific object has been chosen.

An inquiry generated on the basis of the UC record among the at least one specific inquiry may be an inquiry about the specific object chosen by the authentic user and the time at which the specific object has been chosen.

The living history data may include data in which information related to at least one of video data and audio data related to the living history of the authentic user, used by the authentic user through the device, has been converted into text and stored along with a time at which the information has been used.

An inquiry generated on the basis of at least one of the video data and the audio data among the at least one specific inquiry may be an inquiry about information related to the video data or the audio data and a time at which the video data or the audio data has been used.

The voice recognition based user authentication method may further include providing an inquiry about the name of the authentic user to the specific user when the first tone does not match the second tone.

The performing of the second user authentication may further include performing third user authentication based on fingerprint recognition or password input when a correct reply to the at least one specific inquiry among replies of the specific user is less than a predetermined value.

The voice recognition based user authentication method may further include determining whether a voice command uttered by the specific user is executed on the basis of whether security of personal information of the authentic user is required when the second user authentication has been successfully performed.

The voice recognition based user authentication method may further include executing the voice command when security of the personal information of the authentic user is not required.

The voice recognition based user authentication method may further include: performing the second user authentication again when security of the personal information of the authentic user is required; and executing the voice command when the second user authentication has been successfully performed again.

The voice recognition based user authentication method may further include receiving downlink control information (DCI) used to schedule transmission of information related to the second speech from a network, wherein the information related to the second speech is transmitted to the network on the basis of the DCI.

The voice recognition based user authentication method may further include performing an initial access procedure with respect to the network on the basis of a synchronization signal block (SSB).

The voice recognition based user authentication method may further include: controlling a communication unit such that the communication unit transmits the information related to the second speech to an AI processor included in the network; and controlling the communication unit such that the communication unit receives AI-processed second user authentication result information from the AI processor.

An intelligent computing device supporting a voice recognition based user authentication method using an AI device according to another aspect of the present invention includes: a sensing unit including at least one sensor; a processor; and a memory including a command executable by the processor, wherein the command causes the processor: to perform first user authentication on the basis of voice characteristics of a first speech of a specific user; to provide at least one specific inquiry about a living history of an authentic user of the device to the specific user; to sense at least one second speech which is a reply of the specific user to the at least one specific inquiry; and to perform second user authentication for the specific user to use the device on the basis of contents included in the at least one second speech.

The second user authentication may be successfully performed when a correct reply to the at least one specific inquiry is equal to or greater than a specific value in the contents included in the at least one second speech.

ADVANTAGEOUS EFFECTS

The present invention has an advantage in that it can perform user authentication based on voice recognition.

Further, the present invention can inquire of a specific user who performs user authentication about a living history of an authentic user and perform user authentication based on a reply of the specific user to the inquiry.

Further, the present invention can generate inquiries about a living history of an authentic user of a device using artificial intelligence.

It will be appreciated by persons skilled in the art that the effects that could be achieved with the present invention are not limited to what has been particularly described hereinabove and the above and other effects that the present invention could achieve will be more clearly understood from the following detailed description.

The accompanying drawings, which are included to provide a further understanding of the invention and are incorporated in and constitute a part of this specification, illustrate embodiments of the invention and together with the description serve to explain the principles of the invention.

MODE FOR INVENTION

Regarding the Present Invention

A conventional voice recognition based user authentication method simply performs user authentication only on the basis of voice characteristics of a user who performs user authentication. In such a method, if a voice of an authentic user of a specific device is exposed to other people and recorded, there is a risk of successfully performing user authentication through the specific device by other people who have recorded the voice of the authentic user. Accordingly, there is a need for a voice recognition based user authentication method with more advanced security than a user authentication method based only on voice characteristics.

The present invention provides a voice recognition based user authentication method on the basis of a living history of an authentic user of a specific device.

More specifically, the present invention provides a method of providing an inquiry generated by an AI device included in a specific user on the basis of a living history of an authentic user of the specific device to a specific user who performs user authentication in order to use the specific device and performing user authentication on the basis of a reply of the specific user to the generated inquiry.

Hereinafter, a voice recognition based user authentication method using an artificial intelligence (AI) device provided by the present invention will be described in detail.

For convenience of description, a user who performs user authentication through a device is represented as a "specific user" and an authentic user of the device is represented as an "authentic user".

Further, for convenience of description, user authentication performed on the basis of characteristics of a speech of a specific user is represented as "first user authentication" and user authentication performed on the basis of a reply of a specific user to an inquiry about a living history of an authentic user of a device which is provided to the specific user is represented as "second user authentication".

Figure 1:
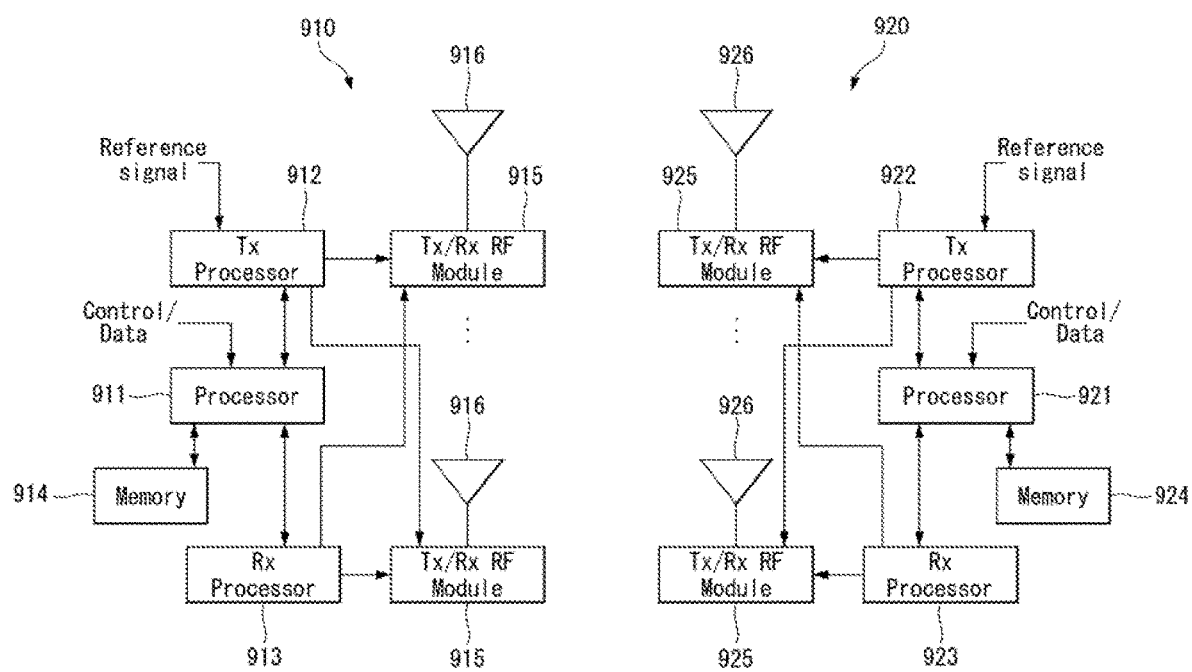
FIG. 1 is a block diagram of a wireless communication system according to an embodiment of the present invention.
Figure 2:
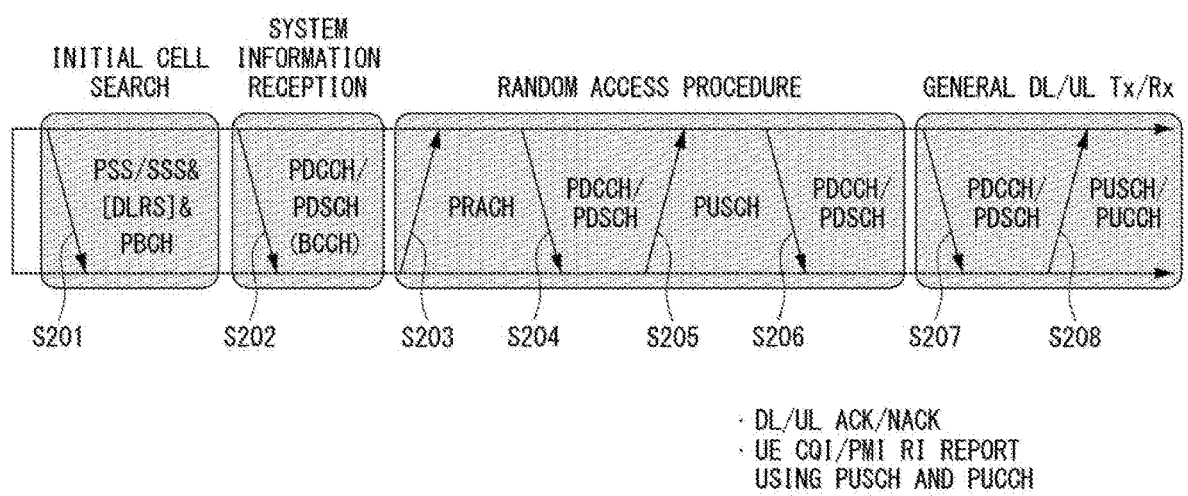
FIG. 2 is a diagram showing an example of a signal transmission/reception method in a wireless communication system.
Figure 3:
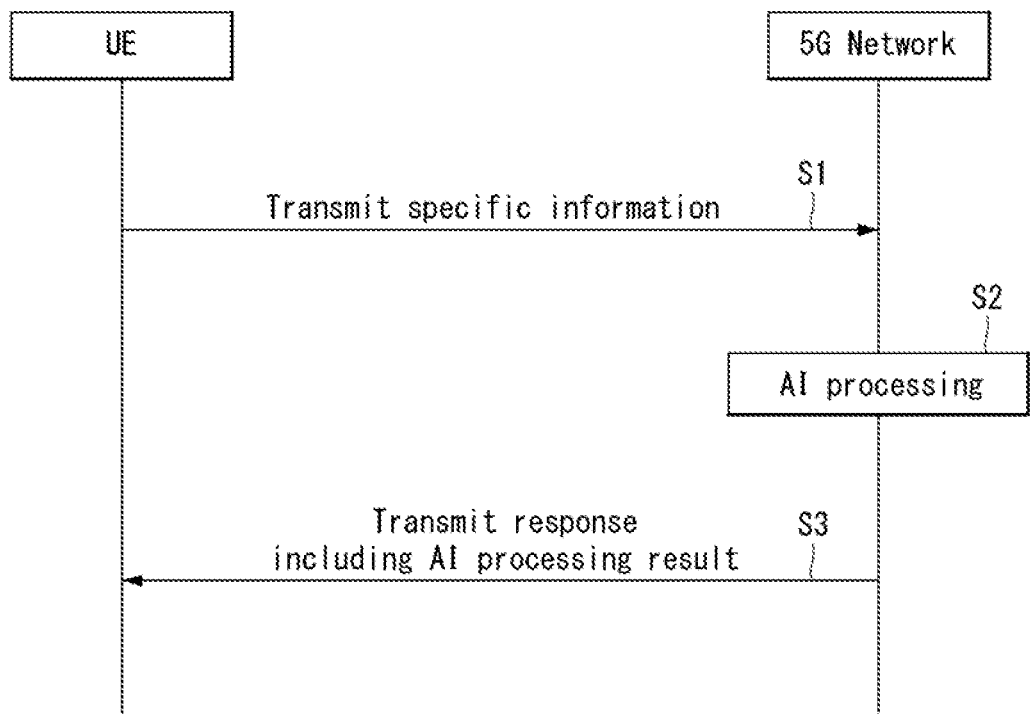
FIG. 3 shows an example of basic operations of user equipment and a 5G network in a 5G communication network.
Figure 4:
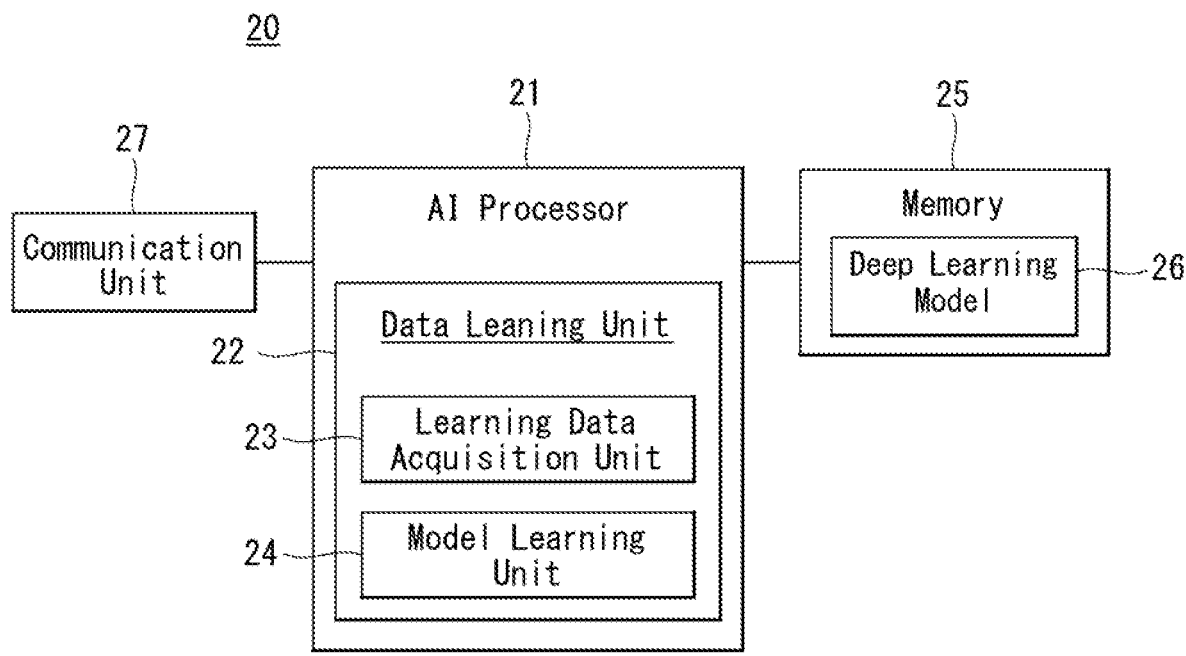
FIG. 4 is a block diagram of an AI device.
Figure 5:
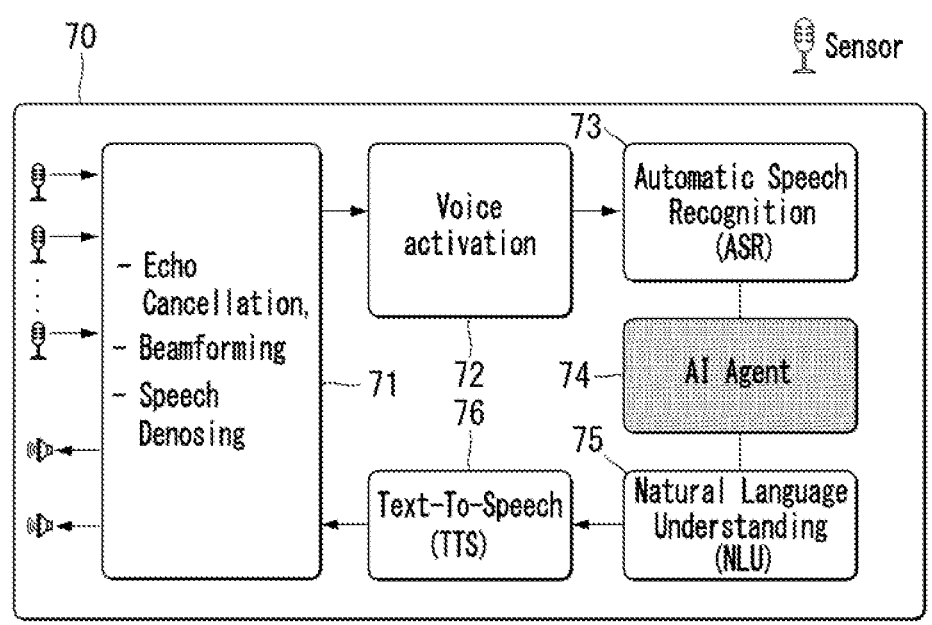
FIG. 5 is a schematic block diagram of a speech processing device using AI according to an embodiment of the present invention.
Figure 6:
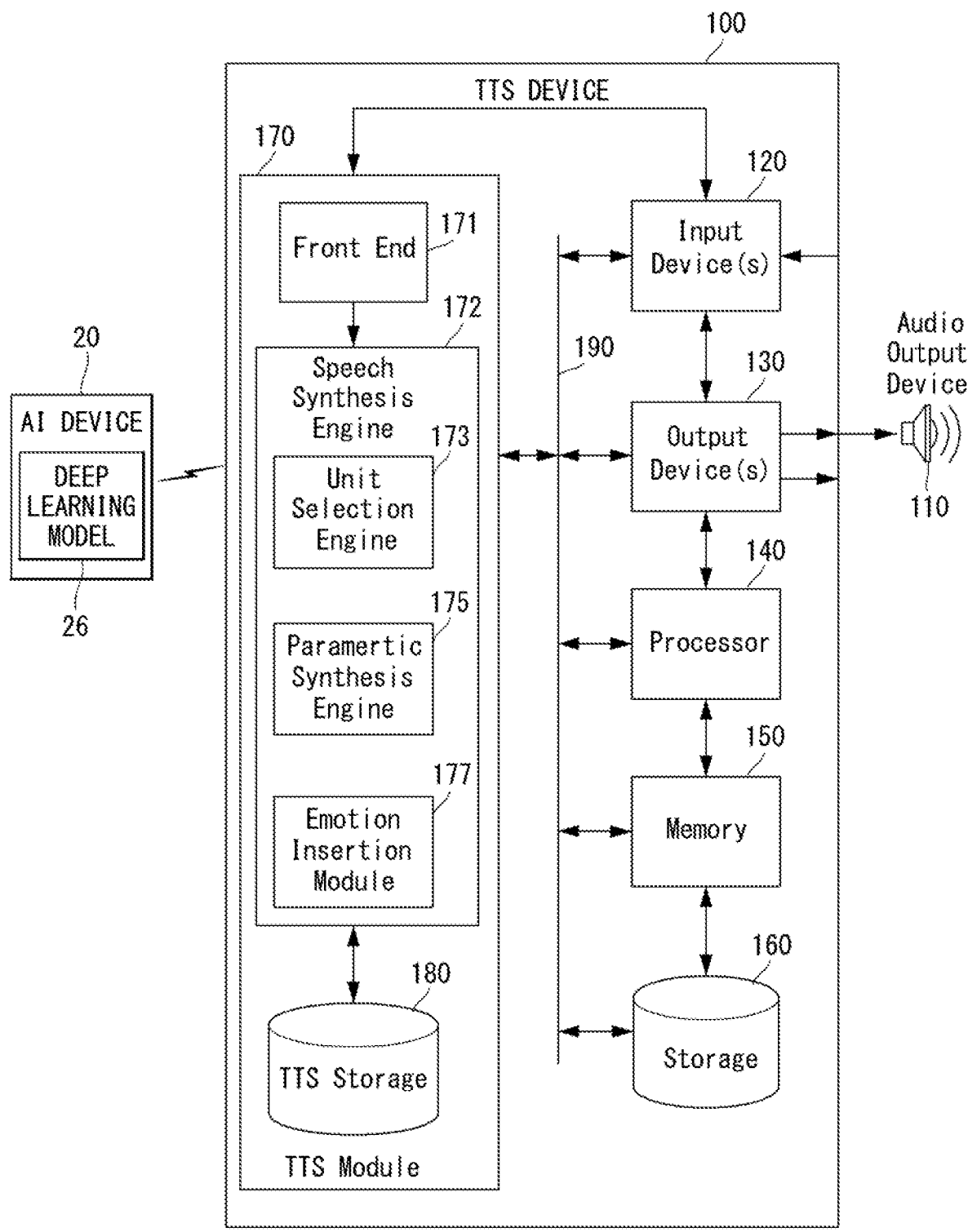
FIG. 6 is a diagram for describing a system associated with a device and an AI device according to an embodiment of the present.
Figure 7:
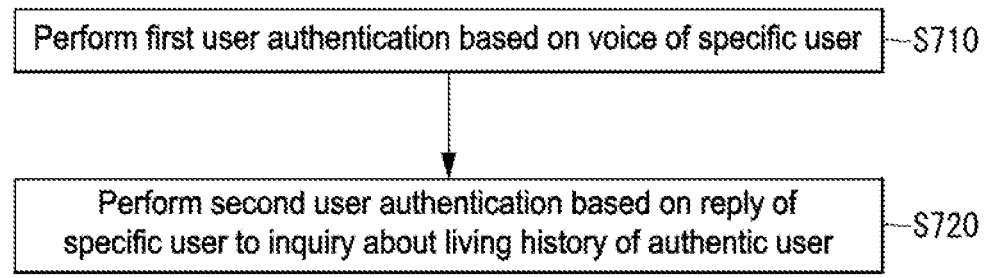
FIG. 7 is a flowchart showing an example in which a voice recognition based user authentication method using an AI device according to an embodiment of the present invention is performed.

FIG. 7 is a flowchart showing an example in which a voice recognition based user authentication method using an AI device according to an embodiment of the present invention is performed.

First, a device performs first user authentication on the basis of characteristics of a speech of a specific user who intends user authentication for the device (S710).

Next, the device provides an inquiry about a living history of an authentic user of the device to the specific user and performs second user authentication on the basis of a reply of the specific user to the inquiry (S720).

Hereinafter, steps S710 to S720 will be described in detail.

Figure 8:
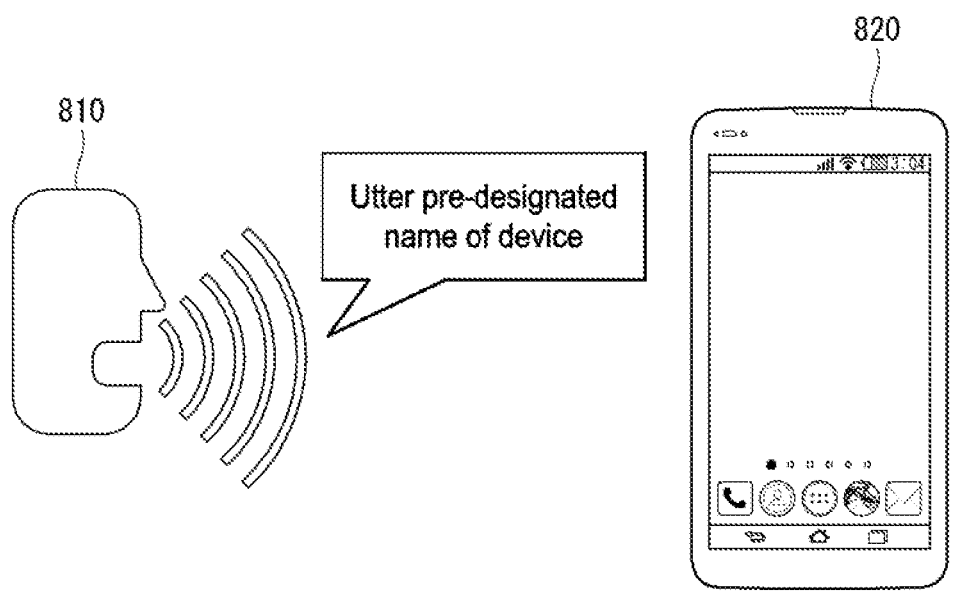
FIG. 8 is a diagram showing an example in which the voice recognition based user authentication method using an AI device according to an embodiment of the present invention is performed.

FIG. 8 is a diagram showing an example in which the voice recognition based user authentication method using an AI device according to an embodiment of the present invention is performed.

A device performs first user authentication on the basis of characteristics of a speech of a specific user who attempts user authentication for the device.

FIG. 8 illustrates a process of performing user authentication on the basis of characteristics of a voice of a specific user. Particularly, an example of performing first user authentication on the basis of a tone among voice characteristics is shown.

First user authentication can be performed on the basis of characteristics of a speech of the specific user. Although the aforementioned voice characteristics can include the contents, tone and the like of the speech, the present invention is not limited thereto and various characteristics in addition to the contents and tone of the speech can be used for first user authentication.

A specific user 810 utters a predesignated name of the device. For example, the specific user can attempt first user authentication by uttering a speech such as "Hi" or "Genie".

The device analyzes a tone from among the speech of the specific user and determines whether the specific user is an authentic user of the device. If the specific user is determined to be an authentic user of the device as a determination result, first authentication can be successfully achieved. Here, information about voice characteristics of the authentic user may be stored in the device in advance.

Figure 9:
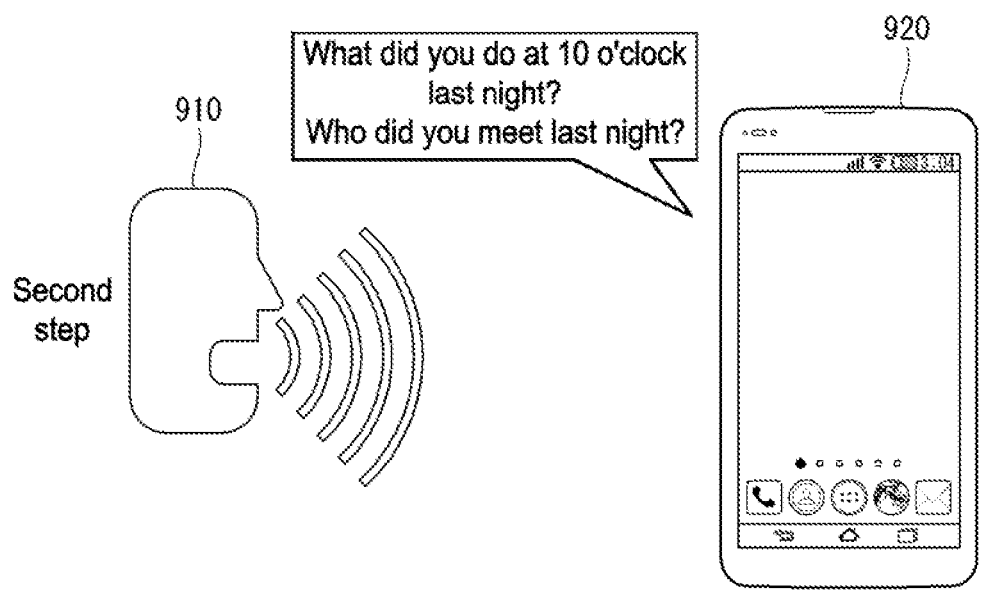
FIG. 9 is a diagram showing an example in which the voice recognition based user authentication method using an AI device according to an embodiment of the present invention is performed.

FIG. 9 is a diagram showing an example in which the voice recognition based user authentication method using an AI device according to an embodiment of the present invention is performed.

A device provides an inquiry about a living history of an authentic user of the device to a specific user and performs second user authentication on the basis of a reply of the specific user to the inquiry.

FIG. 9 illustrates a process in which a device provides inquiries about a living history of an authentic user of the device to a specific user and performs user authentication on the basis of replies of the specific user to the inquiries.

Inquiries about daily life refers to inquiries closely related to a living history of an authentic user, such as "What did you do 10 o'clock last night?" and "Who did you meet last night?", as shown in FIG. 9, instead of simple inquiries about personal information, such as "When is your birthday?", "What is your grandfather's name?" and "What is your favorite color?".

After successful first user authentication, a specific user 910 performs second user authentication. A device 920 generates an inquiry through AI on the basis of data about a living history of an authentic user stored in the device and provides the inquiry to the specific user. Then, the specific user replies to the inquiry to perform second user authentication.

Figure 10:
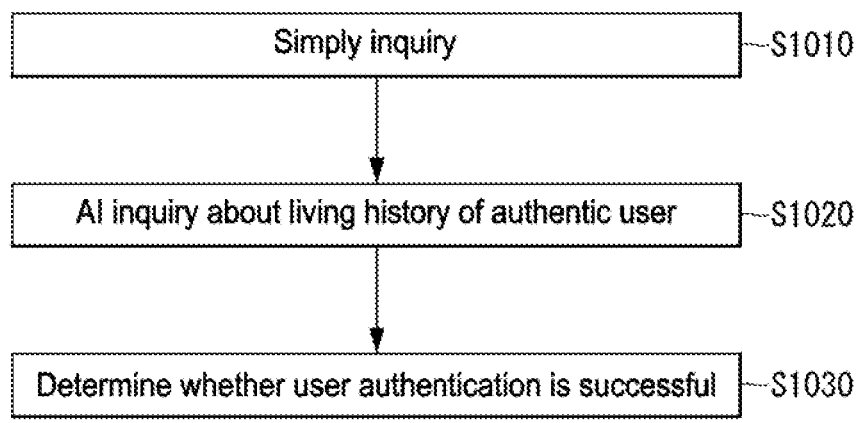
FIG. 10 is a flowchart showing an example in which the voice recognition based user authentication method using an AI device according to an embodiment of the present invention is performed.

FIG. 10 is a flowchart showing an example in which the voice recognition based user authentication method using an AI device according to an embodiment of the present invention is performed.

A second user authentication execution step will be described in more detail with reference to FIG. 10.

A device provides a simple inquiry to a specific user who attempts user authentication for the device (S1010). The simple inquiry may be simple personal information about an authentic user irrelevant to a living history of the authentic user. For example, the simple inquiry may include the birthday of the authentic user, the name of a family member of the authentic user, a favorite color of the authentic user, or the like. Inquiries generated on the basis of such personal information may include, for example, "When is your birthday?" and "What is your grandfather's name?"

Next, the device provides a specific inquiry about the living history of the authentic user of the device to the specific user who attempts second user authentication for the device (S1020).

One or more specific inquiries may be provided and the one or more specific inquiries may be related to different subjects of the living history of the authentic user. Further, the specific inquiry may be generated by an AI device included in the device.

The range of the personal information data about the living history of the authentic user used for the AI device included in the specific device to generate the specific inquiry may include a call use history, a text message record, a visit place record (GPS), a purchase history, pictures stored in the device, schedules, a credit card statement, a game item use history, etc.

The AI device included in the specific device can generate the following inquiries, for example, using the aforementioned personal information data.

First, the specific device can generate inquiries such as "What is your schedule at 00 o'clock on date 00 month 00" and "When is the birthday party of 00?" using schedule information of the authentic user. Further, the specific device can generate inquiries such as "Do you remember whom did you call at 00 o'clock 00 minutes yesterday?" and "You ordered a late-night meal at 00 o'clock 00 minutes yesterday. Which delivery company did you use?" using call use record information of the authentic user.

Further, the specific device can generate inquiries such as "You did shopping at 00 o'clock 00 minutes yesterday. When did you go?" and "You did online shopping at 00 o'clock 00 minutes yesterday. Which brand did you buy?" using credit card statement information of the authentic user. Further, the specific device can generate an inquiry such as "What time did you set the alarm clock to in the morning?" using alarm record information of the authentic user. Lastly, the specific device can generate an inquiry such as "Where were you at 00 o'clock 00 minutes yesterday?" using visit place record information of the authentic user.

The device can store information about the living history of the authentic user in order to generate a specific inquiry about the living history of the authentic user. Data of information about the living history of the authentic user is referred to as living history data. The living history data can be stored in different manners according to data types.

First, the device stores records with respect to user choice (UC). The user choice refers to choosing a specific object related to a service in a process through which the authentic user of the device uses the service through the device. For example, the authentic user can choose a specific product (specific object) in a process through which the authentic user uses an Internet shopping service through the device.

The records with respect to user choice can be stored in such a manner that information about a specific object is converted into text and stored along with a time at which the authentic user chose the specific object. For example, if the authentic user chooses a specific product (specific object) in a process of using the Internet shopping service through the device, the device can store information such as the brand and product type of the specific product along with the time at which the authentic user choose the specific object.

Alternatively, the device converts video data or audio data used (reproduced) by the authentic user into text through an AI neural network and stores the text along with a time at which the authentic user uses the corresponding data.

The AI neural network may include a convolutional Neural Network (CNN), a recurrent neural network (RNN), a generative adversarial network (GAN), etc.

The aforementioned video data or audio data refers to video data or audio data used (reproduced) by the authentic user of the device through the device. For example, if the authentic user of the device plays a game in his/her daily life, items on game screens can be video data. As another example, if the authentic user of the device reproduces concert recorded data in his/her daily life through the device, recorded sound can be audio data.

In such a case, if the authentic user of the device plays a game in his/her daily life, items on game screens can be ascertained through AI, converted into text and stored along with time. Further, if the authentic user of the device reproduces concert recorded data in his/her daily life through the device, the device can ascertain a played song through AI, convert the song into text and store the text along with a playback time.

The device which has stored living history information about the authentic user can generate inquiries on the basis of the stored living history information of the authentic user. Here, inquiries about user choice can be generated in such a manner that user choice at a specific time is inquired. The device can select an inquiry suitable for a user from generated inquires through an AI modeling technique (e.g., machine learning). For example, an inquiry such as "Which bag did you buy at 19:20 yesterday?" or an inquiry similar thereto can be generated. In addition, an inquiry about audio data or video data can be generated in such a manner that data used (reproduced) by a user at a specific time is inquired. For example, an inquiry such as "What is the title of the song of audio data reproduced at 20:25 yesterday?" or an inquiry similar thereto can be generated. Here, the device generates the inquiry in a state in which the device has ascertained data reproduced by the user.

The device stores information about the living history of the authentic user and generates specific inquiries based on the stored information through the aforementioned method. Examples of inquiries which can be generated by the device are as follows. The following examples are merely examples and the present invention is not limited thereto.

When the device extracts navigation information used by the authentic user and generates an inquiry, an inquiry such as "Where did you go riding in the car yesterday?" or an inquiry similar thereto can be generated. Further, when the device analyzes a call record list of the authentic user and generates an inquiry, an inquiry such as "Whom did you call most frequently yesterday?" or an inquiry similar thereto can be generated. Further, when the device analyzes a game/application frequently used by the authentic user and generates an inquiry, an inquiry such as "Which game did you play most frequency recently?" or an inquiry similar thereto can be generated.

Further, when the device analyzes a shopping list of the authentic user and generates an inquiry, an inquiry such as "What did you buy at 00 shopping mall yesterday?" or an inquiry similar thereto can be generated. Further, when the device analyzes a game item played by the authentic user and generates an inquiry, an inquiry such as "Which item did you get defeating the final boss in 000 game played yesterday?" or an inquiry similar thereto can be generated. Alternatively, when the device analyzes schedule information of the user and generates an inquiry, an inquiry such as "You had a 00 meeting on 00 day last week. Where is the meeting place?" or an inquiry similar thereto can be generated and an inquiry such as "You have an appointment with a friend on Thursday next week. What is the friend's name?" or an inquiry similar thereto can be generated.

Further, when the device analyzes a search record of a search engine of the authentic user and generates an inquiry, an inquiry such as "You searched banks yesterday. Which banks did you searched?" or an inquiry similar thereto can be generated or an inquiry such as "You searched stock items yesterday. Which stock items did you searched?" or an inquiry similar thereto can be generated. Further, when the device analyzes camera use information of the authentic user and generates an inquiry, an inquiry such as "You used the camera at 00 o'clock yesterday. Where did you use the camera?", "You used the camera at 00 o'clock yesterday. Which object did you photograph? or an inquiry similar thereto can be generated.

Further, when the device analyzes pictures captured by the authentic user and generates an inquiry, an inquiry such as "Who did you take a picture with yesterday?", "What kind of food did you take a picture last night? or an inquiry similar thereto can be generated. Further, when the device analyzes a recent music play list of the authentic user and generates an inquiry, an inquiry such as "What kind of music do you listen most frequently?", "Which music did you download most recently? or an inquiry similar thereto can be generated. Lastly, when the device analyzes a recent drama play list of the authentic user and generates an inquiry, an inquiry such as "What is the title of the drama viewed at 8 o'clock yesterday?", "Who is the heroine of the drama viewed at 8 o'clock yesterday? or an inquiry similar thereto can be generated.

Next, the device provides generated specific inquiries about the living history of the authentic user to the specific user who attempts user authentication and determines whether second user authentication is successfully performed through replies to the inquiries (S1030).

Various methods of providing generated inquiries about the living history of the authentic user can be provided. First, at least one specific inquiry can be provided to the specific user in a subjective or objective form because the user may not have the perfect memory. For example, if the device generates five inquiries to be provided to the specific user, two of the five inquiries can be provided in an subjective form and the remaining three inquiries can be provided in an objective form.

Here, when the number of correct answers to an inquiry is equal to or greater than a predetermined number, the number of correct answers through which user authentication is determined to be successful can be set in the device in advance.

Alternatively, the device may show a plurality of specific pictures to the specific user who attempts user authentication for the device and cause the specific user to choose a picture related to a specific date from the plurality of specific pictures. In this case, a plurality of inquiries can also be provided to the specific user and the device can determine user authentication to be successful when the number of correct answers is equal to or greater than a predetermined number.

Hereinafter, various examples to which the voice recognition based user authentication method using an AI device provided by the present invention is applied will be described with reference to FIGS. 11 to 18.

Figure 11:
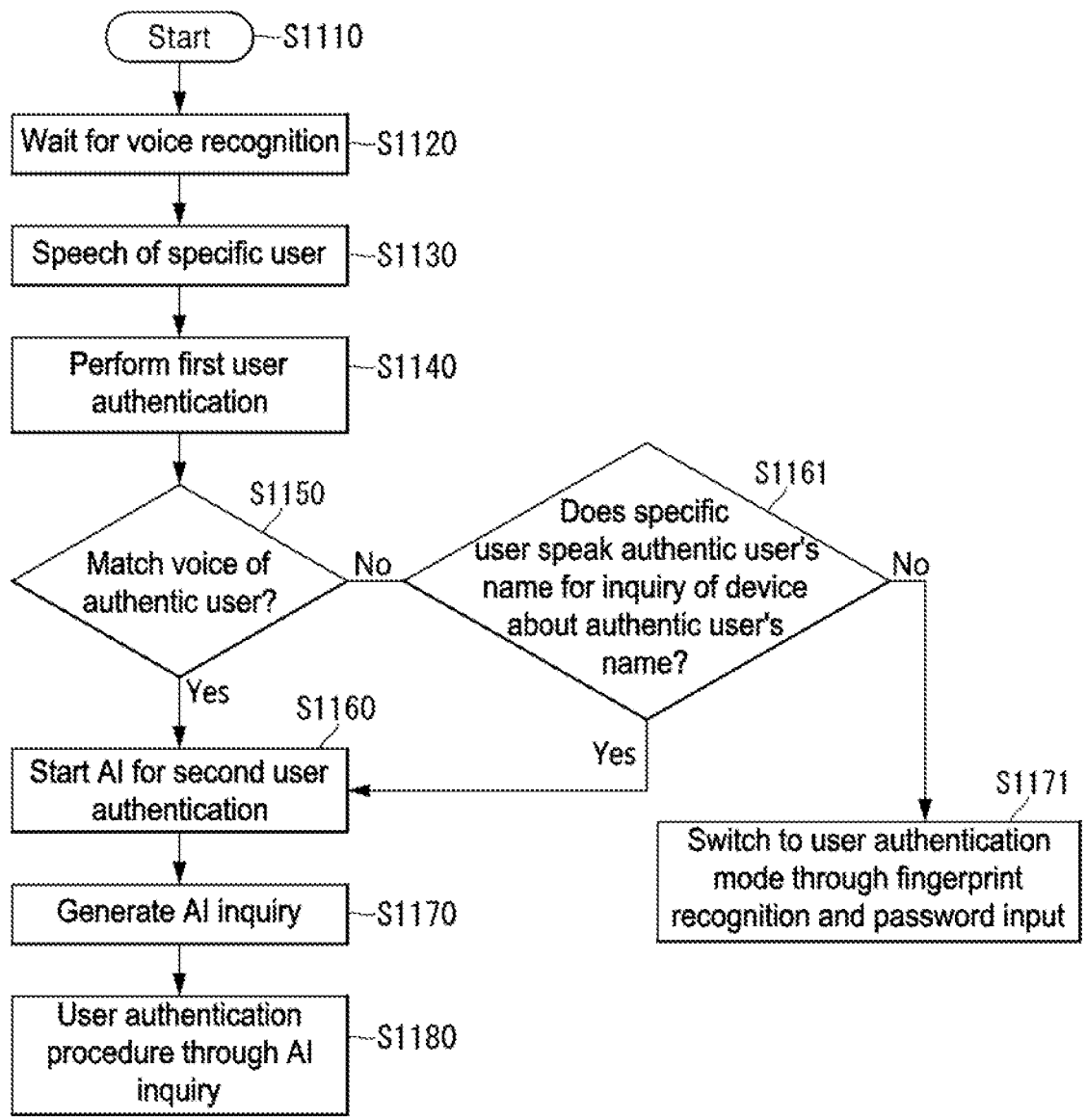
FIG. 11 is a flowchart showing an example in which the voice recognition based user authentication method using an AI device according to an embodiment of the present invention is performed.

FIG. 11 is a flowchart showing an example in which the voice recognition based user authentication method using an AI device according to an embodiment of the present invention is performed.

A device starts a user authentication algorithm for user authentication (S1110).

The device waits to recognize a speech of a specific user in order to perform first user authentication (S1120).

Next, first user authentication is performed when the specific user utters a speech (S1130 and S1140).

The device determines whether the speech of the specific user matches the voice of an authentic user (S1150). Here, the voice of the authentic user may be stored in the device.

When it is determined that the speech of the specific user does not match the voice of an authentic user, the device inquires of the specific user about the name of the authentic user (S1161).

If the specific user does not correctly replay with the name of the authentic user, the device switches to a user authentication mode through fingerprint recognition and password input (S1171). On the other hand, if the specific user correctly replies with the name of the authentic user, the device starts AI for second user authentication (S1160).

Returning back to S1150, when it is determined that the speech of the specific user matches the voice of the authentic user, the device starts AI for second user authentication (S1160).

The device generates AI inquiries (S1170) and performs second user authentication based on the generated inquiries (S1180). The AI inquiries can be automatically generated through AI on the basis of living history information of the authentic user stored in the device.

The second user authentication procedure will be described in detail below.

Figure 12:
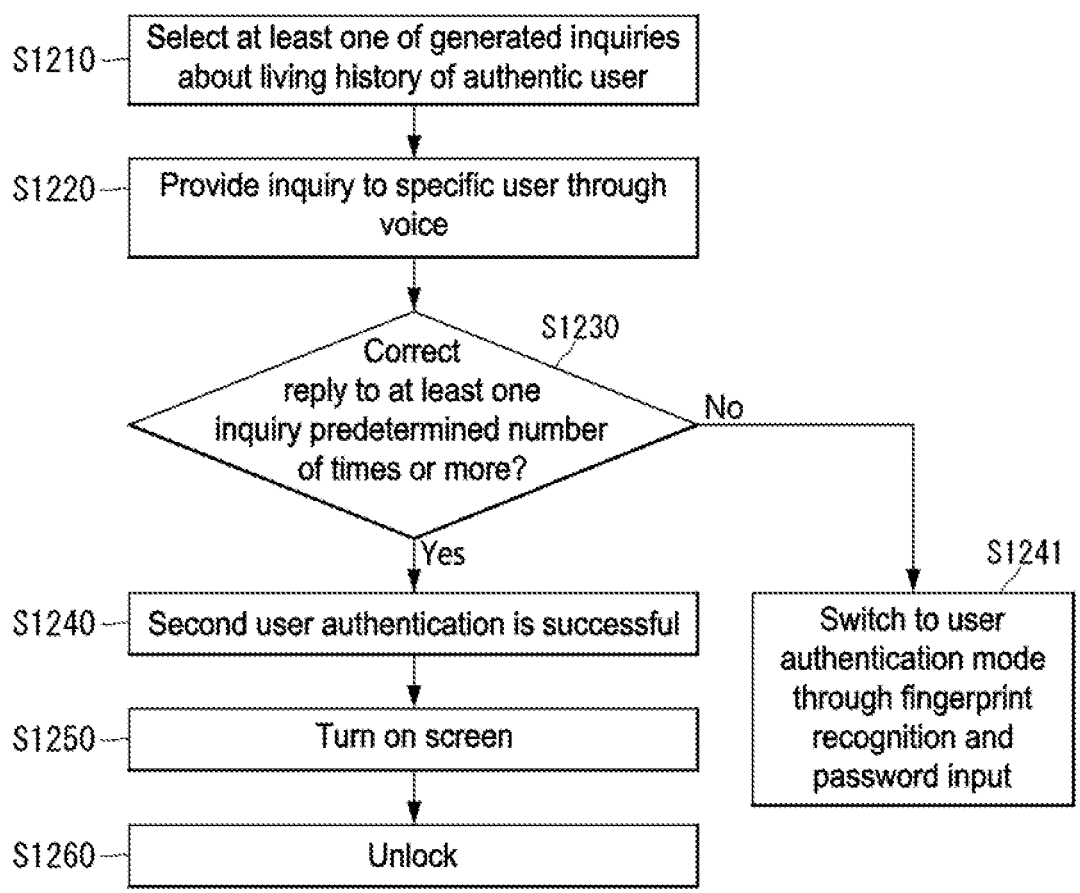
FIG. 12 is a flowchart showing an example in which the voice recognition based user authentication method using an AI device according to an embodiment of the present invention is performed.

FIG. 12 is a flowchart showing an example in which the voice recognition based user authentication method using an AI device according to an embodiment of the present invention is performed.

The device selects at least one of the generated inquiries about the living history of the authentic user (S1210). The at least one selected inquiry is provided to the specific user in order to perform second user authentication.

The device provides the selected inquiry to the specific user (S1220). Here, the inquiry can be directly uttered by the device through a voice and displayed on a display included in the device. Such an inquiry method is merely an example and the present invention is not limited thereto.

Next, the device determines whether the specific user correctly replies to the provided inquiry (S1230).

For example, the device can provide an inquiry of "who did you meet at 00 o'clock on date 00 month 00?" to the specific user on the basis of living history information about meeting of the authentic user at 00 o'clock on data 00 month 00 stored in the device. Here, if the specific user replies with "a friend", it is considered that the specific user correctly replies to the aforementioned inquiry.

If the specific user does not correctly reply to the inquiry more than a predetermined number of times, the device switches to a user authentication mode through fingerprint recognition and password input (S1241). Here, the predetermined number of times can be set by the authentic user in the device or determined by AI included in the device upon determination thereof.

On the other hand, if the specific user correctly replies to the inquiry more than the predetermined number of times, second user authentication is successfully performed (S1240).

When the specific user succeeds in second user authentication, the screen of the device is turned on (S1250) and the device is unlocked (S1260).

Figure 13:
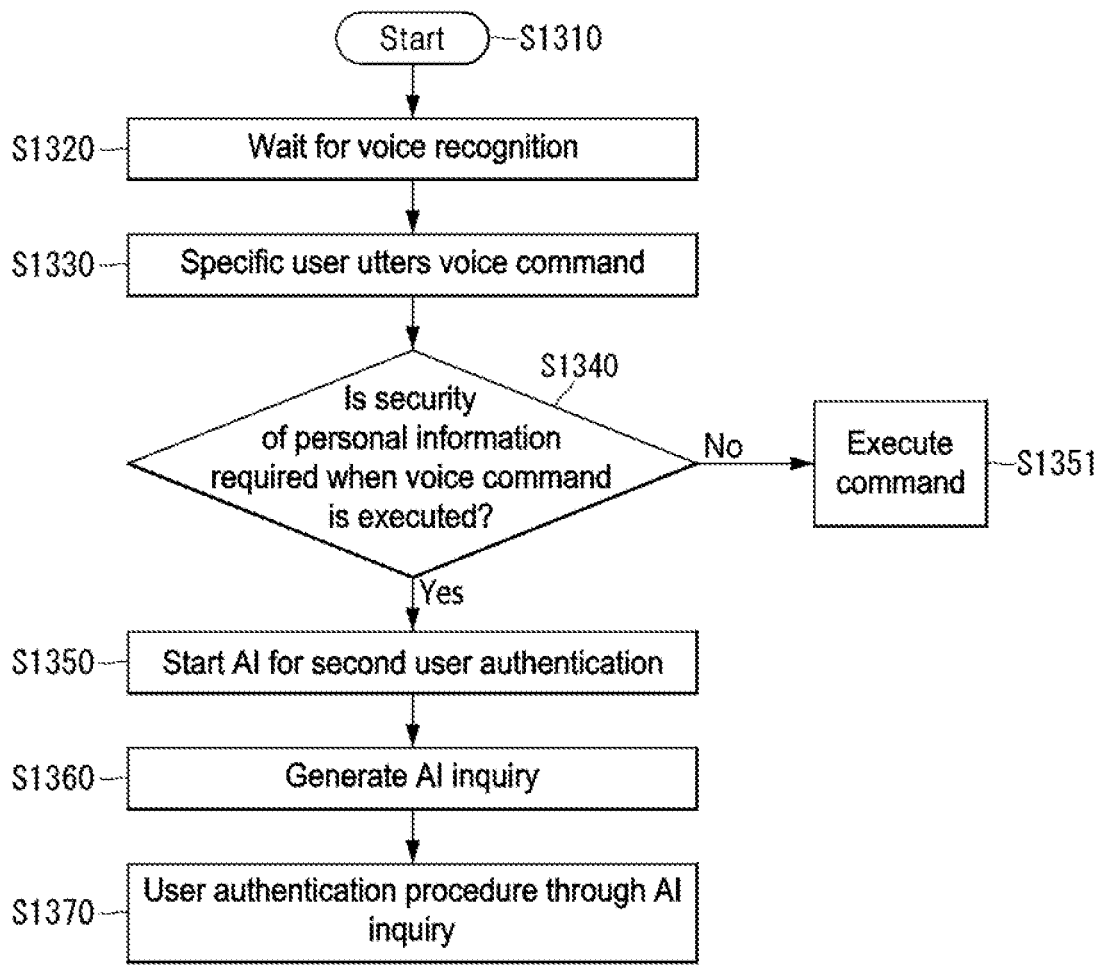
FIG. 13 is a flowchart showing an example in which the voice recognition based user authentication method using an AI device according to an embodiment of the present invention is performed.

FIG. 13 is a flowchart showing an example in which the voice recognition based user authentication method using an AI device according to an embodiment of the present invention is performed.

FIG. 13 shows an example of a case in which the specific user requests an operation of the device with respect to security of personal information of the authentic user of the device through a voice command in a state in which second user authentication is completed.

The device starts a user authentication algorithm for user authentication for voice command execution (S1310).

The device waits to recognize a voice command uttered by the specific user for user authentication for voice command execution (S1320).

Next, the specific user utters a voice command (S1330) and the device determines whether the voice command requires security of personal information of the authentic user of the device (S1340).

When the authentic user of the device has set a specific operation performed by the device as an operation that requires security of personal information, the device can determine that a specific voice command with respect to the specific operation requires security of personal information. Alternatively, it can be determined whether a specific voice command requires security of personal information through learning according to an AI device included in the device.

When it is determined that the aforementioned voice command does not require security of the personal information of the authentic user, the device executes the voice command (S1351).

On the other hand, when it is determined that the aforementioned voice command requires security of the personal information of the authentic user, the device starts AI for second user authentication (S1350).

The device generates AI inquiries (S1360) and performs the second user authentication procedure on the basis of the generated inquiries (S1370). The AI inquiries can be automatically generated through AI on the basis of living history information of the authentic user stored in the device.

Figure 14:
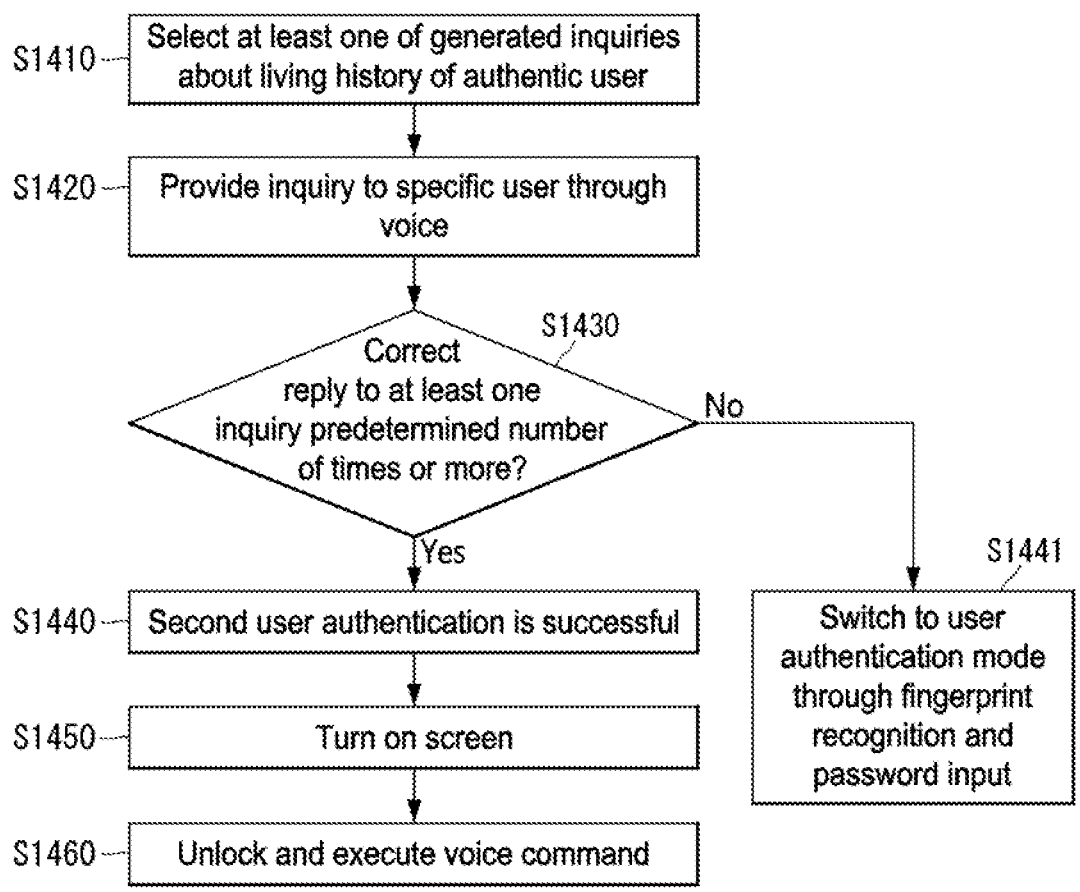
FIG. 14 is a flowchart showing an example in which the voice recognition based user authentication method using an AI device according to an embodiment of the present invention is performed.

FIG. 14 is a flowchart showing an example in which the voice recognition based user authentication method using an AI device according to an embodiment of the present invention is performed.

The device selects at least one of generated inquiries about the living history of the authentic user (S1410). The at least one selected inquiry is provided to the specific user for second user authentication.

The device provides the selected inquiry to the specific user (1420). Here, the inquiry can be directly uttered by the device through a voice and displayed on the display included in the device. This inquiry method is merely an example and the present invention is not limited thereto.

Next, the device determines whether the specific user correctly replies to the provided inquiry (S1430).

For example, the device can provide an inquiry of "who did you meet at 00 o'clock on date 00 month 00?" to the specific user on the basis of living history information about meeting of the authentic user at 00 o'clock on data 00 month 00 stored in the device. Here, if the specific user replies with "a friend", it is considered that the specific user correctly replies to the aforementioned inquiry.

If the specific user does not correctly reply to the inquiry more than a predetermined number of times, the device switches to the user authentication mode through fingerprint recognition and password input (S1441). Here, the predetermined number of times can be set by the authentic user in the device or determined by AI included in the device upon determination thereof.

On the other hand, if the specific user correctly replies to the inquiry more than the predetermined number of times, second user authentication is successfully performed (S1440).

When the specific user succeeds in second user authentication, the screen of the device is turned on (S1450), the device is unlocked and the voice command is executed (S1460).

Figure 15:
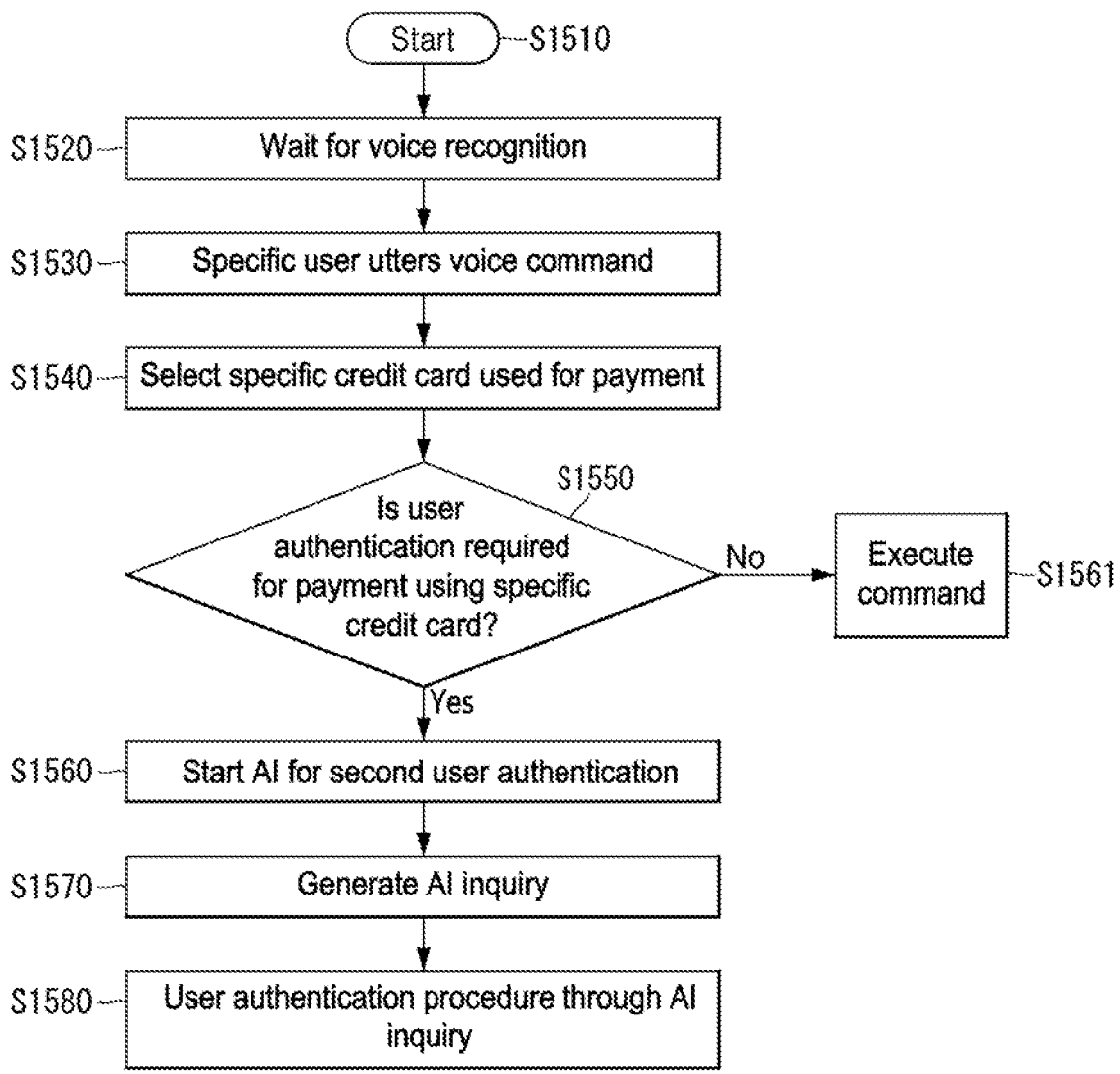
FIG. 15 is a flowchart showing an example in which the voice recognition based user authentication method using an AI device according to an embodiment of the present invention is performed.

FIG. 15 is a flowchart showing an example in which the voice recognition based user authentication method using an AI device according to an embodiment of the present invention is performed.

FIG. 15 shows an example of a case in which the specific user pays for a specific product through a voice command in a state in which second user authentication is completed.

The device starts a user authentication algorithm for user authentication for execution of the voice command for payment for the specific product (S1510).

The device waits to recognize a voice command uttered by the specific user for user authentication for execution of the voice command for payment for the specific product (S1520).

Next, the specific user utters a voice command for payment for the specific product (S1530) and a credit card to be used for payment is selected through a voice command of the specific user (S1540). The specific credit card may be one of a plurality of credit cards registered in the device. Further, the plurality of credit cards may be owned by different users. User authentication information of one or more users may be registered in the device.

Next, the device determines whether payment using the specific credit card requires user authentication (S1550).

It can be determined whether payment using the specific credit card requires user authentication according to whether a user of the specific credit card has set user authentication for payment using the specific credit card.

When it is determined that payment using the specific credit card does not require user authentication, the device executes the voice command (S1561).

On the other hand, when it is determined that payment using the specific credit card requires user authentication, the device starts AI for second user authentication (S1560).

The device generates AI inquiries (S1570) and performs the second user authentication procedure on the basis of the generated inquiries (S1580). The AI inquiries can be automatically generated through AI on the basis of the living history information of the authentic user stored in the device.

Figure 16:
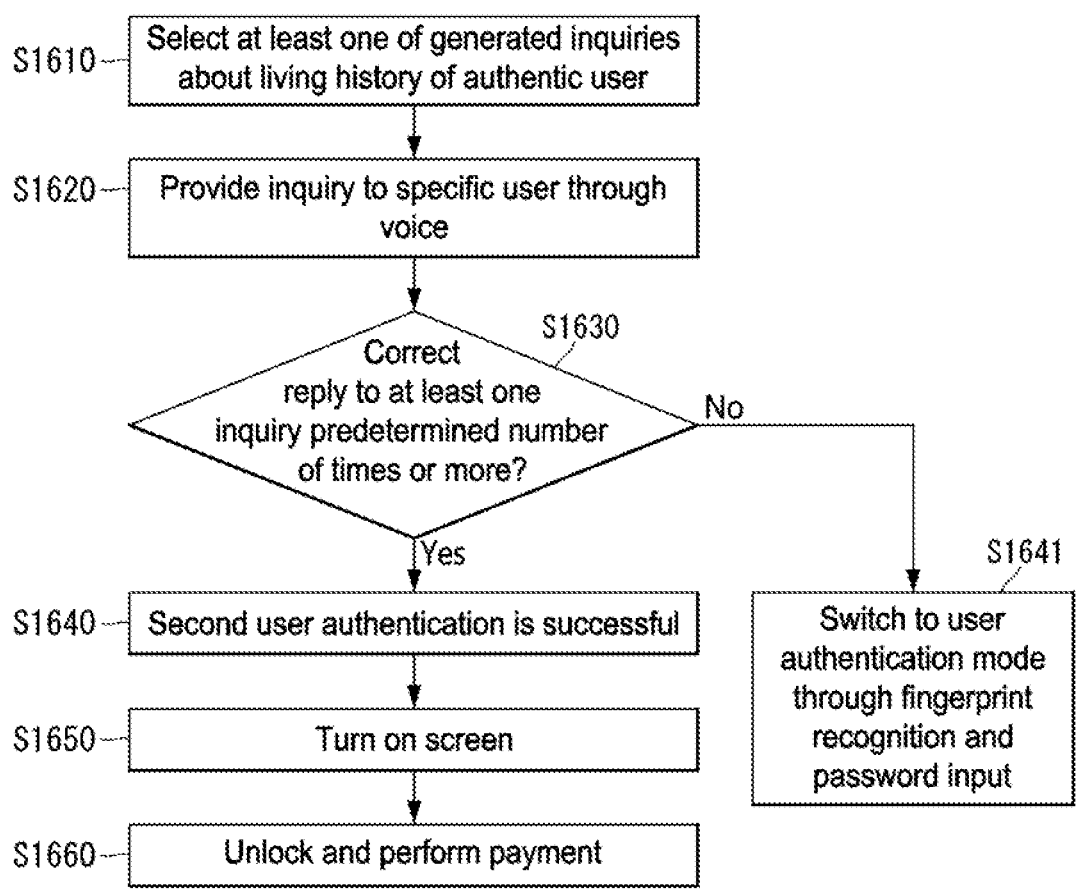
FIG. 16 is a flowchart showing an example in which the voice recognition based user authentication method using an AI device according to an embodiment of the present invention is performed.

FIG. 16 is a flowchart showing an example in which the voice recognition based user authentication method using an AI device according to an embodiment of the present invention is performed.

The device selects at least one of generated inquiries about the living history of the authentic user (S1610). The at least one selected inquiry is provided to the specific user for second user authentication.

The device provides the selected inquiry to the specific user (1620). Here, the inquiry can be directly uttered by the device through a voice and displayed on the display included in the device. This inquiry method is merely an example and the present invention is not limited thereto.

Next, the device determines whether the specific user correctly replies to the provided inquiry (S1630).

For example, the device can provide an inquiry of "For which product did you pay at 00 o'clock on date 00 month 00?" to the specific user on the basis of living history information about payment for the specific product performed by the authentic user at 00 o'clock on data 00 month 00 stored in the device. Here, if the specific user replies with "specific product", it is considered that the specific user correctly replies to the aforementioned inquiry.

If the specific user does not correctly reply to the inquiry more than a predetermined number of times, the device switches to the user authentication mode through fingerprint recognition and password input (S1641). Here, the predetermined number of times can be set by the authentic user in the device or determined by AI included in the device upon determination thereof.

On the other hand, if the specific user correctly replies to the inquiry more than the predetermined number of times, second user authentication is successfully performed (S1640).

When the specific user succeeds in second user authentication, the screen of the device is turned on (S1650), the device is unlocked and payment for the specific product is performed (S1660).

Figure 17:
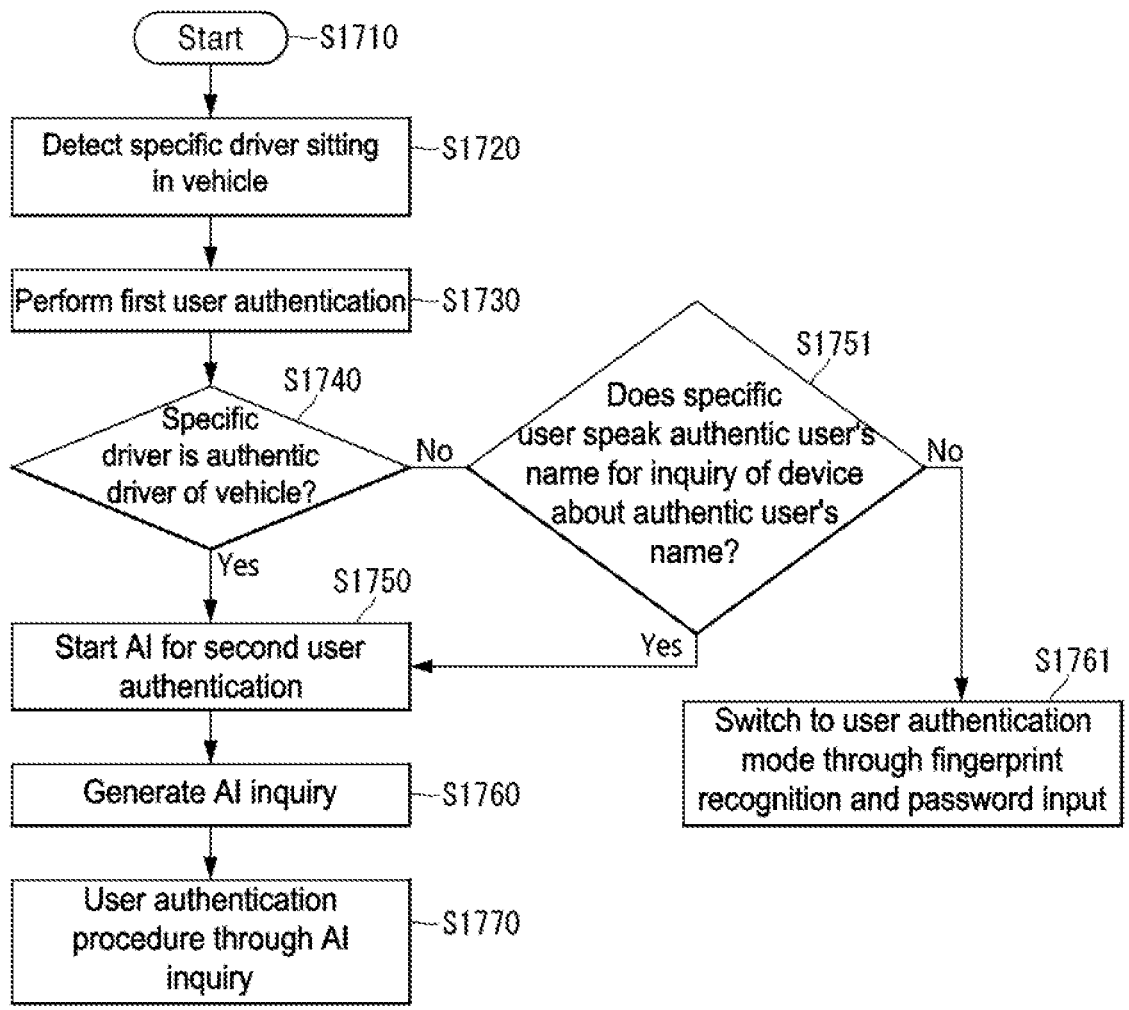
FIG. 17 is a flowchart showing an example in which the voice recognition based user authentication method using an AI device according to an embodiment of the present invention is performed.

FIG. 17 is a flowchart showing an example in which the voice recognition based user authentication method using an AI device according to an embodiment of the present invention is performed.

FIG. 17 shows an example of a case in which a specific driver performs driver authentication for vehicle control.

An AI device in a vehicle starts a user authentication algorithm for driver authentication (S1710).

The AI device detects a specific driver sitting in the vehicle in order to perform first user authentication (S1720).

Next, the AI device performs first user authentication (S1730).

The AI device can perform first user authentication on the basis of the voice of the specific driver or face recognition of the specific driver. Here, voice information of an authentic driver can be stored in the AI device for voice recognition and face information of the authentic driver can be stored in the AI device for face recognition.

The AI device determines whether the specific driver is the authentic driver of the vehicle (S1740).

When it is determined that the specific driver is not the authentic driver, the device inquires of the specific driver about the name of the authentic driver (S1751).

When the specific driver does not correctly reply with the name of the authentic driver, the AI device switches to a driver authentication mode through fingerprint recognition and password input (S1761). On the other hand, when the specific driver correctly replies with the name of the authentic driver, the AI device starts AI for second user authentication (S1750).

The device generates AI inquiries (S1760) and performs the second user authentication procedure on the basis of the generated inquiries (S1770). The AI inquiries can be automatically generated through AI on the basis of the living history information of the authentic user stored in the device.

Figure 18:
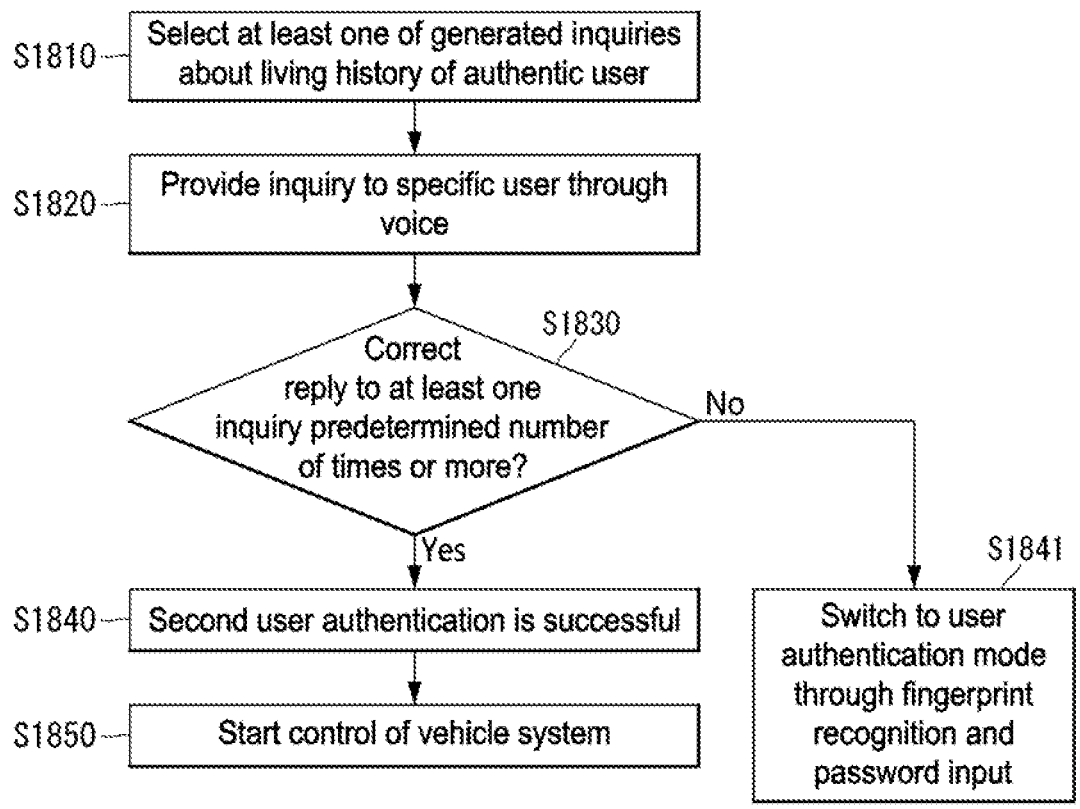
FIG. 18 is a flowchart showing an example in which the voice recognition based user authentication method using an AI device according to an embodiment of the present invention is performed.

FIG. 18 is a flowchart showing an example in which the voice recognition based user authentication method using an AI device according to an embodiment of the present invention is performed.

The AI device provided in the vehicle selects at least one of generated inquiries about a living history of the authentic driver (S1810). The at least one selected inquiry is provided to the specific driver for second user authentication.

The AI device provides the selected inquiry to the specific driver (1820). Here, the inquiry can be directly uttered by the AI device through a voice and displayed on a display provided in the vehicle. This inquiry method is merely an example and the present invention is not limited thereto.

Next, the AI device determines whether the specific driver correctly replies to the provided inquiry (S1830).

For example, the AI device can provide an inquiry of "Which place did you visit at 00 o'clock on date 00 month 00?" to the specific driver on the basis of living history information about the fact that the specific driver visited a specific place by driving the vehicle at 00 o'clock on data 00 month 00 stored in the device. Here, if the specific driver replies with "specific place", it is considered that the specific driver correctly replies to the aforementioned inquiry.

If the specific driver does not correctly reply to the inquiry more than a predetermined number of times, the AI device switches to the user authentication mode through fingerprint recognition and password input (S1841). Here, the predetermined number of times can be set by the authentic driver or determined by the AI device upon determination thereof.

On the other hand, if the specific driver correctly replies to the inquiry more than the predetermined number of times, second user authentication is successfully performed (S1840).

When the specific driver succeeds in second user authentication, the specific driver starts control of the vehicle (S1850).

Figure 19:
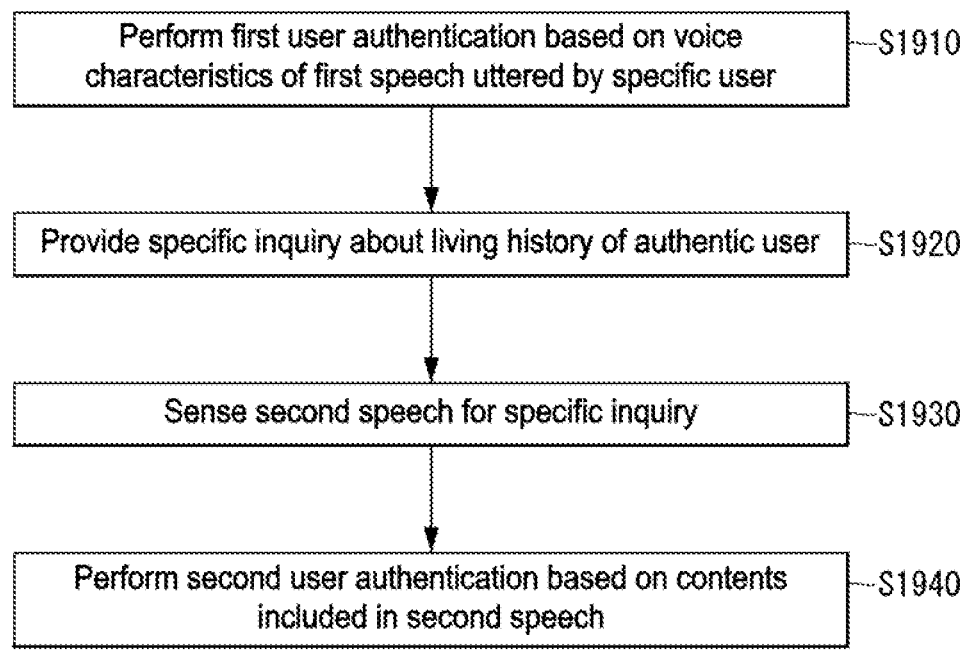
FIG. 19 is a flowchart showing an example in which the voice recognition based user authentication method using an AI device according to an embodiment of the present invention is performed.

FIG. 19 is a flowchart showing an example in which the voice recognition based user authentication method using an AI device according to an embodiment of the present invention is performed.

First, a device performs first user authentication on the basis of voice characteristics of a first speech of a specific user (S1910).

Next, the device provides at least one specific inquiry about a living history of an authentic user of the device to the specific user (S1920).

Then, the device senses at least one second speech which is a reply of the specific user to the at least one specific inquiry (S1930).

Finally, the device performs second user authentication for the specific user to use the device on the basis of contents included in the at least one second speech (S1940).

EMBODIMENTS TO WHICH THE PRESENT INVENTION IS APPLICABLE

Embodiment 1: a voice recognition based user authentication method using an AI device includes the steps of: performing first user authentication on the basis of voice characteristics of a first speech of a specific user; providing at least one specific inquiry about a living history of an authentic user of the device to the specific user; sensing at least one second speech which is a reply of the specific user to the at least one specific inquiry; and performing second user authentication for the specific user to use the device on the basis of contents included in the at least one second speech.

Embodiment 2: in embodiment 1, the second user authentication may be successfully performed when a correct reply to the at least one specific inquiry in the contents included in the at least one second speech is equal to or greater than a specific value.

Embodiment 3: in embodiment 1, the step of performing the first user authentication may further include the steps of: analyzing a first tone of the first speech; and determining whether the first tone matches a second tone of the authentic user.

Embodiment 4: in embodiment 3, the second tone may be stored in advance in the device.

Embodiment 5: in embodiment 1, the step of providing the at least one specific inquiry may further include the step of generating the specific inquiry, by the device, on the basis of living history data in which the living history of the authentic user has been recorded.

Embodiment 6: in embodiment 5, the living history of the authentic user may be associated with at least one of a call record, a text message record, a specific place visit record, a purchase record, a schedule record and a credit card use record of the authentic user.

Embodiment 7: in embodiment 5, the living history data may include data in which a user choice (UC) record with respect to a choice of a specific object related to the living history of the authentic user, performed by the authentic user using the device, has been converted into text and stored along with a time at which the specific object has been chosen.

Embodiment 8: in embodiment 7, an inquiry generated on the basis of the UC record among the at least one specific inquiry may be an inquiry about the specific object chosen by the authentic user and the time at which the specific object has been chosen.

Embodiment 9: in embodiment 5, the living history data may include data in which information related to at least one of video data and audio data related to the living history of the authentic user, used by the authentic user through the device, has been converted into text and stored along with a time at which the information has been used.

Embodiment 10: in embodiment 9, an inquiry generated on the basis of at least one of the video data and the audio data among the at least one specific inquiry may be an inquiry about information related to the video data or the audio data and a time at which the video data or the audio data has been used.

Embodiment 11: in embodiment 3, the voice recognition based user authentication method may further include the step of providing an inquiry about the name of the authentic user to the specific user when the first tone does not match the second tone.

Embodiment 12: in embodiment 1, the step of performing the second user authentication may further include the step of performing third user authentication based on fingerprint recognition or password input when a correct reply to the at least one specific inquiry among replies of the specific user is less than a predetermined value.

Embodiment 13: in embodiment 1, the voice recognition based user authentication method may further include the step of determining whether a voice command uttered by the specific user is executed on the basis of whether security of personal information of the authentic user is required when the second user authentication has been successfully performed.

Embodiment 14: in embodiment 13, the voice recognition based user authentication method may further include the step of executing the voice command when security of the personal information of the authentic user is not required.

Embodiment 15: in embodiment 13, the voice recognition based user authentication method may further include: the steps of performing the second user authentication again when security of the personal information of the authentic user is required; and executing the voice command when the second user authentication has been successfully performed again.

Embodiment 16: in embodiment 1, the voice recognition based user authentication method may further include the step of receiving downlink control information (DCI) used to schedule transmission of information related to the second speech from a network, wherein the information related to the second speech may be transmitted to the network on the basis of the DCI.

Embodiment 17: in embodiment 16, the voice recognition based user authentication method may further include the step of performing an initial access procedure with respect to the network on the basis of a synchronization signal block (SSB).

Embodiment 18: in embodiment 16, the voice recognition based user authentication method may further include the steps of: controlling a communication unit such that the communication unit transmits the information related to the second speech to an AI processor included in the network; and controlling the communication unit such that the communication unit receives AI-processed second user authentication result information from the AI processor.

Embodiment 19: an intelligent computing device supporting a voice recognition based user authentication method using an AI device includes: a sensing unit including at least one sensor; a processor; and a memory including a command executable by the processor, wherein the command causes the processor to perform first user authentication on the basis of voice characteristics of a first speech of a specific user, to provide at least one specific inquiry about a living history of an authentic user of the device to the specific user, to sense at least one second speech which is a reply of the specific user to the at least one specific inquiry and to perform second user authentication for the specific user to use the device on the basis of contents included in the at least one second speech.

Embodiment 20: in embodiment 19, the second user authentication may be successfully performed when a correct reply to the at least one specific inquiry is equal to or greater than a specific value in the contents included in the at least one second speech.

Embodiment 21: in embodiment 19, the command may cause the processor to analyze a first tone of the first speech and to determine whether the first tone matches a second tone of the authentic user in order to cause the processor to perform the first user authentication.

Embodiment 22: in embodiment 21, the second tone may be stored in advance in the device.

Embodiment 23, in embodiment 19, the command may cause the processor to generate the specific inquiry on the basis of living history data in which the living history of the authentic user has been recorded in order to cause the processor to provide the at least one specific inquiry.

Embodiment 24: in embodiment 23, the living history of the authentic user may be associated with at least one of a call record, a text message record, a specific place visit record, a purchase record, a schedule record and a credit card use record of the authentic user.

Embodiment 25: in embodiment 23, the living history data may include data in which a user choice (UC) record with respect to a choice of a specific object related to the living history of the authentic user, performed by the authentic user using the device, has been converted into text and stored along with a time at which the specific object has been chosen.

Embodiment 26: in embodiment 25, an inquiry generated on the basis of the UC record among the at least one specific inquiry may be an inquiry about the specific object chosen by the authentic user and the time at which the specific object has been chosen.

Embodiment 27: in embodiment 23, the living history data may include data in which information related to at least one of video data and audio data related to the living history of the authentic user, used by the authentic user through the device, has been converted into text and stored along with a time at which the information has been used.

Embodiment 28: in embodiment 27, an inquiry generated on the basis of at least one of the video data and the audio data among the at least one specific inquiry may be an inquiry about information related to the video data or the audio data and a time at which the video data or the audio data has been used.

Embodiment 29: in embodiment 21, the command may cause the processor to provide an inquiry about the name of the authentic user to the specific user when the first tone does not match the second tone.

Embodiment 30: in embodiment 19, the command may cause the processor to perform third user authentication based on fingerprint recognition or password input when a correct reply to the at least one specific inquiry among replies of the specific user is less than a predetermined value in order to cause the processor to perform the second user authentication.

Embodiment 31: in embodiment 19, the command may cause the processor to determine whether to execute a voice command uttered by the specific user on the basis of whether security of personal information of the authentic user is required when the second user authentication has been successfully performed.

Embodiment 32: in embodiment 31, the command may cause the processor to execute the voice command when security of the personal information of the authentic user is not required.

Embodiment 33: in embodiment 31, the command may cause the processor to perform the second user authentication again when security of the personal information of the authentic user is required and to execute the voice command when the second user authentication has been successfully performed again.

Embodiment 34: in embodiment 19, the intelligent computing device may further include a communication unit, wherein the command may cause the processor to control the communication unit such that the communication unit receives downlink control information (DCI) used to schedule transmission of information related to the second speech from a network, wherein the information related to the second speech may be transmitted to the network on the basis of the DCI.

Embodiment 35: in embodiment 34, the command may cause the processor to control the communication unit to perform an initial access procedure with respect to the network on the basis of a synchronization signal block (SSB).

Embodiment 36: in embodiment 34, the command may cause the processor to control the communication unit such that the communication unit transmits the information related to the second speech to an AI processor included in the network and to control the communication unit such that the communication unit receives AI-processed second user authentication result information from the AI processor.

The voice recognition based user authentication method using an AI device according to the present invention has the following advantages. According to at least one of the embodiments of the present invention, the present invention can realize a voice recognition based user authentication method. Further, according to at least one of the embodiments of the present invention, a method of providing an inquiry about a living history of an authentic user of a device to a specific user who performs user authentication and performing user authentication based on a replay of the specific user to the inquiry can be realized. According to at least one of the embodiments of the present invention, inquiries about a living history of an authentic user of a device can be generated using AI.

The intelligent computing device supporting the voice recognition based user authentication method using an AI device according to the present invention has the following advantages. According to at least one of the embodiments of the present invention, the present invention can realize a voice recognition based user authentication method. Further, according to at least one of the embodiments of the present invention, a method of providing an inquiry about a living history of an authentic user of a device to a specific user who performs user authentication and performing user authentication based on a replay of the specific user to the inquiry can be realized. According to at least one of the embodiments of the present invention, inquiries about a living history of an authentic user of a device can be generated using AI.

The above-described present invention can be implemented with computer-readable code in a computer-readable medium in which program has been recorded. The computer-readable medium may include all kinds of recording devices capable of storing data readable by a computer system. Examples of the computer-readable medium may include a hard disk drive (HDD), a solid state disk (SSD), a silicon disk drive (SDD), a ROM, a RAM, a CD-ROM, magnetic tapes, floppy disks, optical data storage devices, and the like and also include such a carrier-wave type implementation (for example, transmission over the Internet). Therefore, the above embodiments are to be construed in all aspects as illustrative and not restrictive. The scope of the invention should be determined by the appended claims and their legal equivalents, not by the above description, and all changes coming within the meaning and equivalency range of the appended claims are intended to be embraced therein.

The features, structures and effects described in the above-described embodiments are included in at least one embodiment of the present invention and are not limited to only one embodiment. Furthermore, features, structures and effects illustrated in each embodiment can be combined or modified by those skilled in the art in other embodiments. Accordingly, contents related to such combination and modification should be interpreted as being included in the scope of the present invention.

In addition, although the invention has been described with reference to the exemplary embodiments, those skilled in the art will appreciate that various modifications and variations can be made in the present invention without departing from the spirit or scope of the invention. For example, each construction described in the above embodiments can be modified. Differences with respect to such modification and application should be interpreted as being included in the scope of the present invention defined by the claims.

What is claimed is:

1. A voice recognition based user authentication method using an artificial intelligence (AI) device, the voice recognition based user authentication method comprising:
    performing first user authentication based on voice characteristics of a first speech of a specific user;
    providing at least one specific inquiry about a living history of an authentic user of the device to the specific user;
    sensing at least one second speech which is a reply of the specific user to the at least one specific inquiry;
    performing second user authentication for the specific user to use the device based on contents included in the at least one second speech; and determining whether a voice command uttered by the specific user is executed based on whether security of personal information of the authentic user is required when the second user authentication has been successfully performed, wherein performing the first user authentication comprises:

analyzing a first tone of the first speech;

determining whether the first tone matches a second tone of the authentic user; and providing an inquiry about a name of the authentic user to the specific user based on determining that the first tone does not match the second tone, wherein the providing of the at least one specific inquiry comprises generating the at least one specific inquiry, by the device, based on living history data in which the living history of the authentic user has been recorded, wherein the living history data includes data in which a user choice (UC) record with respect to a choice of a specific object related to the living history of the authentic user, performed by the authentic user using the device, has been converted into text and stored along with a time at which the specific object has been chosen, wherein an inquiry generated based on the UC record among the at least one specific inquiry is an inquiry about the specific object chosen by the authentic user and the time at which the specific object has been chosen.

2. The voice recognition based user authentication method of claim 1, wherein the second user authentication is successfully performed when a correct reply to the at least one specific inquiry in the contents included in the at least one second speech is equal to or greater than a specific value.

3. The voice recognition based user authentication method of claim 1, wherein the second tone is stored in advance in the device.

4. The voice recognition based user authentication method of claim 1, wherein the living history of the authentic user is associated with at least one of a call record, a text message record, a specific place visit record, a purchase record, a schedule record or a credit card use record of the authentic user.

5. The voice recognition based user authentication method of claim 1, wherein the living history data includes data in which information related to at least one of video data or audio data related to the living history of the authentic user, used by the authentic user through the device, has been converted into text and stored along with a time at which the information has been used.

6. The voice recognition based user authentication method of claim 5, wherein an inquiry generated based on the at least one of the video data or the audio data among the at least one specific inquiry is an inquiry about information related to the video data or the audio data and a time at which the video data or the audio data has been used.

7. The voice recognition based user authentication method of claim 1, wherein the performing of the second user authentication comprises performing third user authentication based on fingerprint recognition or password input when a correct reply to the at least one specific inquiry among replies of the specific user is less than a predetermined value.

8. The voice recognition based user authentication method of claim 1, further comprising executing the voice command based on the security of the personal information of the authentic user not being required.

9. The voice recognition based user authentication method of claim 1, further comprising:

performing the second user authentication again based on the security of the personal information of the authentic user being required; and executing the voice command when the second user authentication has been successfully performed again.

10. The voice recognition based user authentication method of claim 1, further comprising receiving downlink control information (DCI) used to schedule transmission of information related to the second speech from a network, wherein the information related to the second speech is transmitted to the network based on the DCI.

11. The voice recognition based user authentication method of claim 10, further comprising performing an initial access procedure with respect to the network based on a synchronization signal block (SSB).

12. The voice recognition based user authentication method of claim 10, further comprising:

controlling a communication unit such that the communication unit transmits the information related to the second speech to an AI processor included in the network; and controlling the communication unit such that the communication unit receives AI-processed second user authentication result information from the AI processor.

13. An intelligent computing device for supporting a voice recognition based user authentication method using an artificial intelligence (AI) device, the intelligent computing device comprising:

at least one sensor;

a processor; and a memory storing at least one command executable by the processor, wherein the at least one command causes the processor to:

perform first user authentication based on voice characteristics of a first speech of a specific user;

provide at least one specific inquiry about a living history of an authentic user of the device to the specific user;

sense at least one second speech which is a reply of the specific user to the at least one specific inquiry;

perform second user authentication for the specific user to use the device based on contents included in the at least one second speech; and determine whether a voice command uttered by the specific user is executed based on whether security of personal information of the authentic user is required when the second user authentication has been successfully performed, wherein the at least one command causes the processor to perform the first user authentication by:

analyzing a first tone of the first speech;

determining whether the first tone matches a second tone of the authentic user; and providing an inquiry about a name of the authentic user to the specific user based on determining that the first tone does not match the second tone, and wherein the at least one command further causes the processor to provide the at least one specific inquiry by generating the at least one specific inquiry based on living history data in which the living history of the authentic user has been recorded, wherein the living history data includes data in which a user choice (UC) record with respect to a choice of a specific object related to the living history of the authentic user, performed by the authentic user using the device, has been converted into text and stored along with a time at which the specific object has been chosen, wherein an inquiry generated based on the UC record among the at least one specific inquiry is an inquiry about the specific object chosen by the authentic user and the time at which the specific object has been chosen.

14. The intelligent computing device of claim 13, wherein the second user authentication is successfully performed when a correct reply to the at least one specific inquiry is equal to or greater than a specific value in the contents included in the at least one second speech.

* * * * *